(12) United States Patent  
Parikh et al.

(10) Patent No.: US 9,208,502 B2
(45) Date of Patent: Dec. 8, 2015

(54) SENTIMENT ANALYSIS

(75) Inventors: Mihir Parikh, Secaucus, NJ (US); Robert M. Fabricant, Brooklyn, NY (US); Ed Hicks, Brooklyn, NY (US)

(73) Assignee: IPC SYSTEMS, INC., Jersey City, NJ (US)

( * ) Notice: Subject to any disclaimer, the term of this patent is extended or adjusted under 35 U.S.C. 154(b) by 174 days.

(21) Appl. No.: 13/353,982

(22) Filed: Jan. 19, 2012

(65) Prior Publication Data

US 2012/0191730 A1 Jul. 26, 2012

Related U.S. Application Data

(60) Provisional application No. 61/434,708, filed on Jan. 20, 2011.

(51) Int. Cl.
| | | |
|---|---|---|
| *G06F 7/00* | (2006.01) | |
| *G06F 17/30* | (2006.01) | |
| *G06Q 30/02* | (2012.01) | |
| *G06Q 40/04* | (2012.01) | |
| *G06Q 40/06* | (2012.01) | |

(52) U.S. Cl.
CPC ............ *G06Q 30/0201* (2013.01); *G06Q 40/04* (2013.01); *G06Q 40/06* (2013.01)

(58) Field of Classification Search
CPC .......... G06Q 30/0201; G06Q 30/0202; G06Q 40/04; G06Q 40/06
USPC .................................................. 707/705–788
See application file for complete search history.

(56) References Cited

U.S. PATENT DOCUMENTS

| | | | |
|---|---|---|---|
| 5,371,673 A | 12/1994 | Fan .......................... | 364/419.01 |
| 2007/0208569 A1* | 9/2007 | Subramanian et al. ....... | 704/270 |
| 2008/0208820 A1* | 8/2008 | Usey et al. ......................... | 707/3 |
| 2008/0306899 A1* | 12/2008 | Gregory et al. ................... | 707/1 |
| 2009/0249244 A1 | 10/2009 | Robinson et al. .............. | 715/781 |
| 2010/0119053 A1 | 5/2010 | Goeldi ..................... | 379/265.09 |
| 2010/0121707 A1* | 5/2010 | Goeldi ........................ | 705/14.49 |
| 2010/0205541 A1 | 8/2010 | Rapaport et al. .............. | 715/753 |
| 2010/0275128 A1* | 10/2010 | Ward et al. ..................... | 715/744 |
| 2010/0306249 A1 | 12/2010 | Hill et al. ....................... | 707/769 |
| 2011/0246921 A1* | 10/2011 | Mercuri et al. ............... | 715/771 |

(Continued)

OTHER PUBLICATIONS

Logunov, A. et al., "A Tweet in time: Can Twitter Sentiment analysis improve economic indicator estimation and predict market returns?" School of Economics, The University of New South Wales, Australia (URL:<http://www.aswb.unsw.edu.au/schools/economics/documents/A.logunov%20- %20%20Tweeek%20In%20Time%20- %20Can%20Twitter%20Sentiment%20Improve%20Economics%20Indicator%20Estimation.pdf>), Oct. 24, 2011 (71 pages).

(Continued)

*Primary Examiner* — Taelor Kim
(74) *Attorney, Agent, or Firm* — Fitzpatrick, Cella, Harper & Scinto

(57) ABSTRACT

Data is received from multiple data sources. At least one of the data sources is an active audio or video communication. The received data is analyzed by extracting instances of a keyword from the received data and analyzing contextual data near the keyword. Sentiment about the extracted keyword is gauged based on the contextual data. The derived sentiment data from the multiple data sources is aggregated, and an aggregated view of the derived sentiment data is presented.

20 Claims, 7 Drawing Sheets

(56) References Cited

U.S. PATENT DOCUMENTS

| | | | |
|---|---|---|---|
| 2012/0011158 A1* | 1/2012 | Avner et al. | 707/777 |
| 2012/0046936 A1* | 2/2012 | Kandekar et al. | 704/9 |
| 2012/0158989 A1* | 6/2012 | Patil et al. | 709/235 |
| 2012/0191730 A1 | 7/2012 | Parikh et al. | 707/754 |

OTHER PUBLICATIONS

International Search Report and Written Opinion for International Patent Application No. PCT/US2012/021886, dated Aug. 9, 2012 (7 pages).

*JumpTo Forensic Demo—YouTube*, Nov. 5, 2010, http://www.youtube.com/watch?v=cl32x8FCeYc (snapshots of video; 4 pages) (last accessed Apr. 29, 2013).

*Find Your Voice*, Intelligent Voice, http://www.intelligentvoice.com (2 pages) (last accessed Apr. 29, 2013).

*Intelligent Voice for Lawyers*, Intelligent Voice, http://www.intelligentvoice.com/lawyers.html (1 page) (last accessed Apr. 29, 2013).

*Intelligent Voice for Security*, Intelligent Voice, http://www.intelligentvoice.com/security.html (2 pages) (last accessed Apr. 29, 2013).

*Intelligent Voice for Forensic Investigation*, Intelligent Voice, http://www.intelligentvoice.com/forensic.html (2 pages) (last accessed Apr. 29, 2013).

*Intelligent Voice for Compliance*, Intelligent Voice, http://www.intelligentvoice.com/compliance.html (2 pages) (last accessed Apr. 29, 2013).

*Intelligent Voice for Dodd-Frank*, Intelligent Voice, http://www.intelligentvoice.com/dodd-frank.html (2 pages) (last accessed Apr. 29, 2013).

*Intelligent Voice for Enterprise Vault*, Intelligent Voice, http://www.intelligentvoice.com/enterprise-vault.html (2 pages) (last accessed Apr. 29, 2013).

*Intelligent Voice for Data Leakage*, Intelligent Voice, http://www.intelligentvoice.com/data-leakage.html (1 page) (last accessed Apr. 29, 2013).

*How Intelligent Voice Works*, Intelligent Voice, http://www.intelligentvoice.com/technology-flow.html (2 pages) (last accessed Apr. 29, 2013).

\* cited by examiner

SENTIMENT ANALYSIS

CROSS-REFERENCE TO RELATED APPLICATION

This application claims priority to U.S. Provisional Application No. 61/434,708, filed Jan. 20, 2011, the contents of which are incorporated herein by reference.

BACKGROUND

1. Field

Example aspects of the present invention generally relate to analysis of multiple sources of received communications and/or data.

2. Related Art

In the financial industry and other information-intensive environments, it is common for a user to receive information from multiple sources. For example, a stock trader may receive information during a conference call from a trading desk, monitor a video broadcast, listen to a 'hoot', and receive multimedia feeds containing various text based messages or other information.

However, due to the complexity and volume of information being received and variations in opinions from different sources, it is often difficult to obtain a meaningful grasp on how the various sources view a particular topic or a particular piece of information, and what the aggregate view is. The problem is exacerbated when information is being received in real-time or pseudo-real time and contains unstructured data, as with voice calls.

BRIEF DESCRIPTION

The example embodiments described herein address the foregoing by providing systems, apparatuses, methods, and computer program products for analyzing received data. Data is received from multiple data sources. At least one of the data sources is an active audio or video communication. The received data is analyzed by extracting instances of a keyword from the received data and analyzing contextual data near the keyword. Sentiment about the extracted keyword is gauged based on the contextual data. The derived sentiment data from the multiple data sources is aggregated, and an aggregated view of the derived sentiment data is presented.

Further features and advantages, as well as the structure and operation, of various example embodiments of the present invention are described in detail below with reference to the accompanying drawings.

BRIEF DESCRIPTION OF THE DRAWINGS

The features and advantages of the example embodiments presented herein will become more apparent from the detailed description set forth below when taken in conjunction with the drawings.

DETAILED DESCRIPTION

I. Overview

Figure 1:
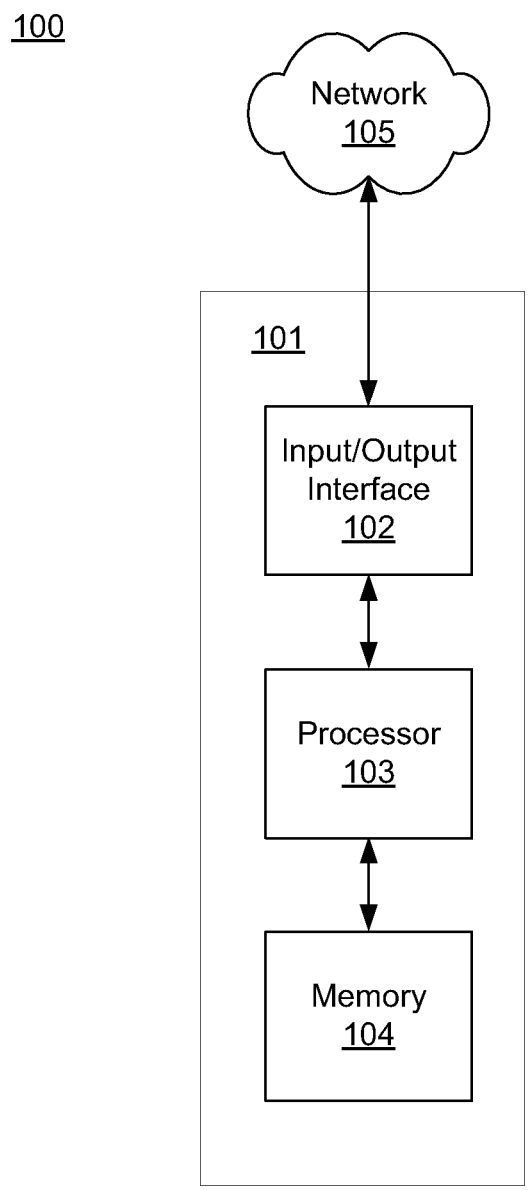
FIG. 1 is a representative view of a system in which some embodiments of the invention may be implemented.

The example embodiments of the invention presented herein are directed to apparatuses, methods, and computer program products for analysis in a trading environment using consumer or professional devices. This description is not intended to limit the application of the example embodiments presented herein. In fact, after reading the following description, it will be apparent to one skilled in the relevant art(s) how to implement the following example embodiments in alternative environments, such as a services-based environment, a web services-based environment, etc.

II. Definitions

Some terms are defined below for easy reference. However, it should be understood that the defined terms are not rigidly restricted to their definitions. A term may be further defined by its use in other sections of this description.

"Device" means software, hardware or a combination thereof. A device may sometimes be referred to as an apparatus. Examples of a device include without limitation a desk phone, turret, laptop computer, a database, a server, a display, a computer mouse, and a hard disk.

"Network" means a connection between any two or more computers, which permits the transmission of data. A network may be any combination of networks, including without limitation the Internet, a network of networks, a local area network (e.g., home network, intranet), a wide area network, a wireless network and a cellular network.

"Server" means a software application that provides services to other computer programs (and their users), in the same or another computer. A server may also refer to the physical computer that has been set aside to run a specific server application. For example, when the software Apache HTTP Server is used as the web server for a company's website, the computer running Apache is also called the web server. Server applications can be divided among server computers over an extreme range, depending upon the workload.

"Software" and "application" mean a computer program that is written in a programming language that may be used by one of ordinary skill in the art. The programming language chosen should be compatible with the computer by which the software application is to be executed and, in particular, with the operating system of that computer. Examples of suitable programming languages include without limitation Object Pascal, C, C++, and Java. Further, the functions of some embodiments, when described as a series of steps for a method, could be implemented as a series of software instructions for being operated by a processor, such that the embodiments could be implemented as software, hardware, or a combination thereof. Computer readable media are discussed in more detail in a separate section below.

"System" means a device or multiple coupled devices. A device is defined above.

"User device" (e.g., "client", "client device", "user computer") is a hardware system, a software operating system and/or one or more software application programs. A user device may refer to a single computer or to a network of interacting computers. A user device may be the client part of a client-server architecture. A user device may rely on a server to perform some operations. Examples of a user device include without limitation a personal media device, a portable media player, an iPod™, an iPad™, a laptop computer, a palmtop computer, a smart phone, a cell phone, a mobile phone, a network attached storage (NAS) device, an IBM-type personal computer (PC) having an operating system such as Microsoft Windows™, an Apple™ computer having an operating system such as MAC-OS, hardware having a JAVA-OS operating system, and a Sun Microsystems Workstation having a UNIX operating system.

III. System

FIG. 1 is a representative view of a system in which some embodiments of the invention may be implemented. As shown in FIG. 1, system 100 includes user device 101 coupled to communication network 105. More specifically, user device 101 includes input/output interface 102, which is communicatively coupled to, and provides bi-directional communication capability between the user device 101 and multiple other devices, such as multimedia feeds or other data sources, via communication network 105. Information data of the data sources is transmitted via network 105, is received by input/output interface 102 and is forwarded to processor 103 for processing.

In that regard, information may be transmitted in real-time or pseudo-real-time over network 105 to user device 101. Moreover, information transmitted over network 105 may include various different types of multimedia data including, for example, live or recorded video or audio and/or transcription thereof from a variety of sources including personal calls, calls from a trading floor or conference calls, and video broadcasts, and multimedia feeds or social networking updates such as Twitter™, persistent chats or instant messages, and market statistics, among many others. Thus, it should be understood that the received data likely includes multiple information flows or transmissions from multiple information sources connected to network 105.

Processor 103 is also communicatively coupled to memory 104, which contains program instructions that processor 103 executes to perform, among other tasks, functions associated with analyzing the received data. Example functions stored in memory 104 and executed by processor 103 include receiving data from at least one of a set of data sources, extracting instances of a keyword from the received data and analyzing contextual data near the keyword, gauging sentiment about the extracted keyword based on the contextual data, aggregating the derived sentiment data, and presenting an aggregated view of the derived sentiment data, etc.

Memory 104 may also store input data from the information flow, such as streaming video data or transcribed telephone calls. In some embodiments, memory 104 might further store, for example, information regarding keywords, sentiment data extracted from contextual information around the keywords, network history, etc. Various other data may be stored in memory 104.

Processor 103 receives data, e.g., over network 105. Processor 103 analyzes the received data, extracts instances of a keyword from the received data and analyzes contextual data near the keyword, and gauges and displays sentiment about the extracted keyword based on the contextual data, as described more fully below.

IV. Device

Figure 2:
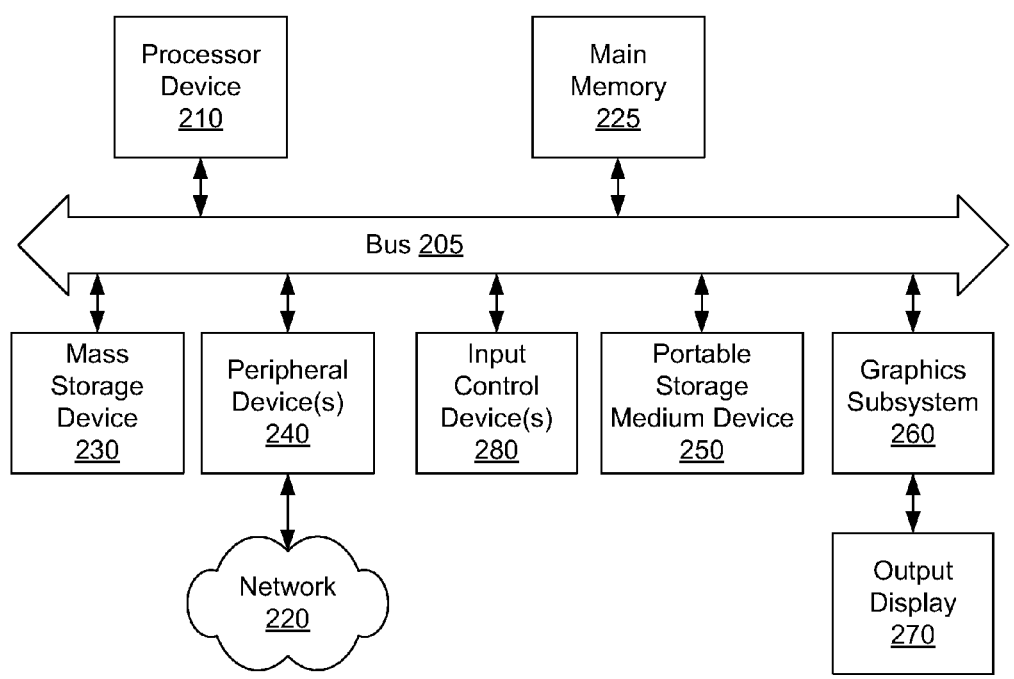
FIG. 2 is a block diagram of a device for use with various example embodiments of the invention.

FIG. 2 is a block diagram of a general and/or special purpose computer 200, which may be a general and/or special purpose computing device, in accordance with some of the example embodiments of the invention. The computer 200 may be, for example, a user device, a user computer, a client computer and/or a server computer, among other things.

The computer 200 may include without limitation a processor device 210, a main memory 225, and an interconnect bus 205. The processor device 210 may include without limitation a single microprocessor, or may include a plurality of microprocessors for configuring the computer 200 as a multi-processor system. The main memory 225 stores, among other things, instructions and/or data for execution by the processor device 210. The main memory 225 may include banks of dynamic random access memory (DRAM), as well as cache memory.

The computer 200 may further include a mass storage device 230, peripheral device(s) 240, portable storage medium device(s) 250, input control device(s) 280, a graphics subsystem 260, and/or an output display interface 270. For explanatory purposes, all components in the computer 200 are shown in FIG. 2 as being coupled via the bus 205. However, the computer 200 is not so limited. Devices of the computer 200 may be coupled via one or more data transport means. For example, the processor device 210 and/or the main memory 225 may be coupled via a local microprocessor bus. The mass storage device 230, peripheral device(s) 240, portable storage medium device(s) 250, and/or graphics subsystem 260 may be coupled via one or more input/output (I/O) buses. The mass storage device 230 may be a nonvolatile storage device for storing data and/or instructions for use by the processor device 210. The mass storage device 230 may be implemented, for example, with a magnetic disk drive or an optical disk drive. In a software embodiment, the mass storage device 230 is configured for loading contents of the mass storage device 230 into the main memory 225.

The portable storage medium device 250 operates in conjunction with a nonvolatile portable storage medium, such as, for example, a compact disc read only memory (CD-ROM), to input and output data and code to and from the computer 200. In some embodiments, the software for storing information may be stored on a portable storage medium, and may be inputted into the computer 200 via the portable storage medium device 250. The peripheral device(s) 240 may include any type of computer support device, such as, for example, an input/output (I/O) interface configured to add additional functionality to the computer 200. For example, the peripheral device(s) 240 may include a network interface card for interfacing the computer 200 with a network 220.

The input control device(s) 280 provide a portion of the user interface for a user of the computer 200. The input control device(s) 280 may include a keypad, a touchscreen, and/or a cursor control device. The keypad may be configured for inputting alphanumeric characters and/or other key information. The cursor control device may include, for example, a handheld controller or mouse, a trackball, a stylus, and/or cursor direction keys. In order to display textual and graphical information, the computer 200 may include the graphics subsystem 260 and the output display 270. The output display 270 may include a cathode ray tube (CRT) display and/or a liquid crystal display (LCD). The graphics subsystem 260 receives textual and graphical information, and processes the information for output to the output display 270.

Each component of the computer 200 may represent a broad category of a computer component of a general and/or special purpose computer. Components of the computer 200 are not limited to the specific implementations provided here.

V. Sentiment Analysis

Figure 3:
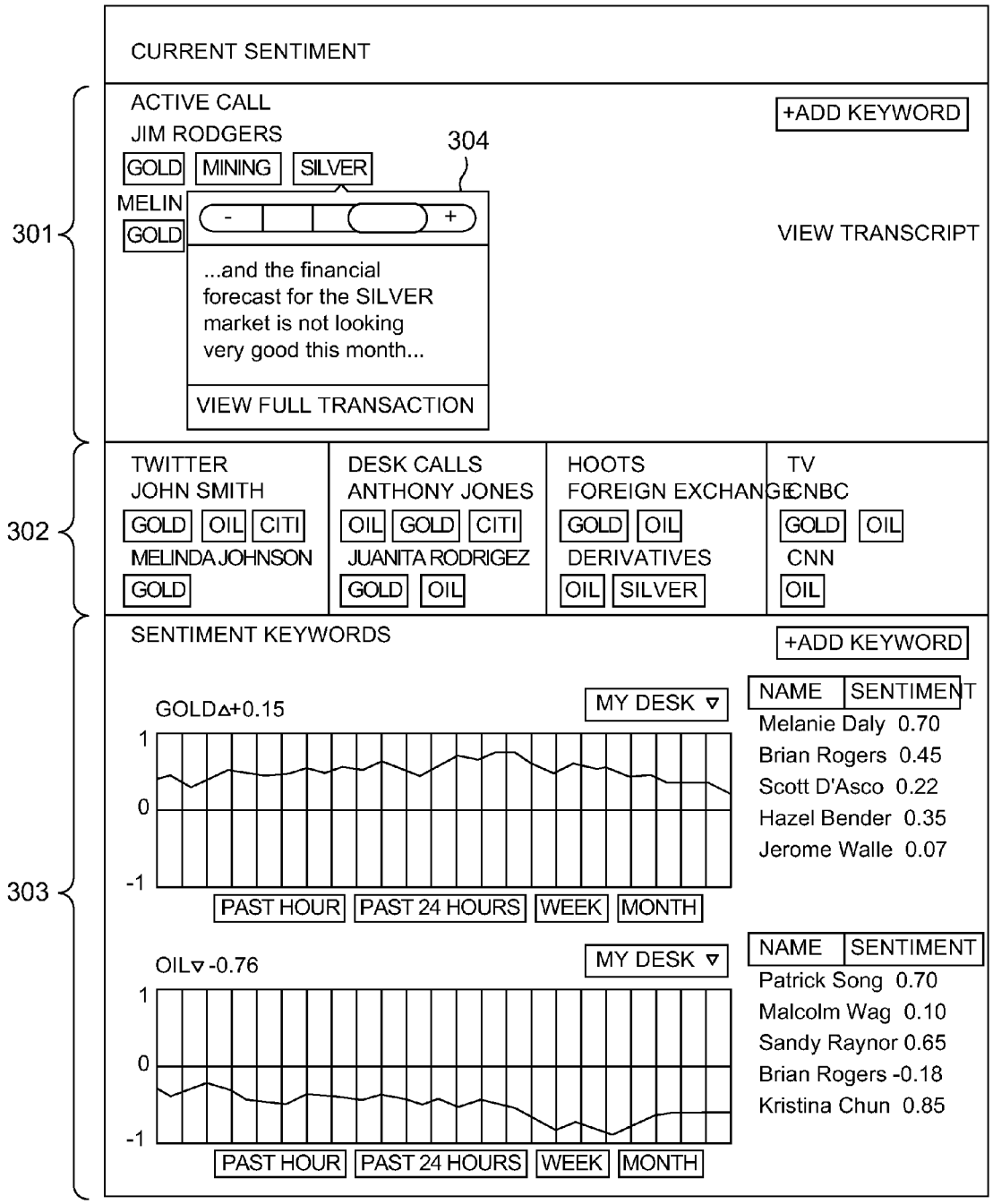
FIG. 3 is a representative view of an example user interface according to the invention.

FIG. 3 is a representative view of an example user interface according to the invention. The sentiment analysis user interface provides a real-time/historic view of sentiment (positive/negative feelings) about, for example, portfolio holdings throughout a financial institution or other group. The embodiment combines, among other trends, voice-audio to text transcription, keyword or pattern spotting, and sentiment analysis.

More specifically, the analysis engine can extract keywords from audio or video calls (e.g., from a person, desk of traders, floor of traders, from specialized conference calls broadcast to one or multiple parties called "hoots", or from video broadcasts), or from audio of video broadcast (e.g., from live television), and analyze sentiment associated with keyword targets such as "gold" or "oil". In one example, voice-to-text transcription is used to extract keywords and contextual data from active audio or video communications. In addition, the analysis engine may extract keywords and analyze sentiment from data feeds such as Twitter™ or other social media networks, or persistent chat and instant messaging (IM), among others.

Keywords may be defined by a user or system administrator, or dynamically generated based on other content being accessed by the user, allowing for a specific vocabulary to be leveraged and customized for specific classes of assets or items. The keywords could be loaded into the system using, for example, a user interface or a configuration file, an application programming interface (API), among others. Additionally, the keywords, call data, and transcriptions could be saved into a customer relationship management (CRM) system or on the desktop itself. For example, if a particular customer or trader deals frequently in oil, oil could be in a set of keywords for that trader. As shown in FIG. 3, when a caller speaks about one of the keywords, on the traders active call or other calls in the organization that are being monitored, an icon indicating the keyword is brought to the user's attention. A user or trader can also define one or more keywords before or during the call to supplement the words derived from the analytics engine.

As shown in FIG. 3, sentiment user interface 300 displays sentiment on the trading desk for each of a set of selected commodities. Sentiment user interface 300 includes, for example, active call section 301 (for active calls of the end user), broadcast/data feed section 302, and sentiment display 303.

In more detail, active call section 301 displays active calls including the user plus other persons (e.g., traders), along with icons or objects representing selected keywords mentioned during the call, such as "gold", "mining" or "silver". Analysis of calls for keywords may be initiated by a separate control item such as a call analysis icon (not shown). As shown in FIG. 3, the call includes two other persons, although any number of persons might be included on the call. For example, calls could be shared across an entire trading desk, which might include multiple traders. Thus, there may be multiple calls being simultaneously received, transcribed, and analyzed by a single user. Active call section 301 may also include selectable icons or objects to add additional keywords, or to view a transcript of the call generated via voice-to-text transcription. The user may also be provided with icons or objects or objects by which to initiate new active calls, or to end current ones.

Broadcast/data feed section 302 displays keywords extracted from various other data sources, including Twitter™, desk calls, "hoots", and television broadcasts. Broadcast/data feed section 302 also displays the identity of the person (e.g., John Smith) or source (e.g., CNN™) transmitting the broadcast or message, and icons or objects representing selected keywords mentioned during the broadcast or message. As with audio calls, there may be multiple video or television broadcasts or other feeds being simultaneously received, transcribed, and analyzed. In addition, some video broadcasts may include additional embedded metadata which can also be analyzed. In still other examples, keywords and contextual data are extracted from a live text chat, persistent chat or instant messaging, or other multimedia feeds.

Sentiment display 303 displays a visual indication of sentiment for selected keywords. In this example, positive and negative sentiments about the keyword are displayed as a graph of sentiment for the keyword over time, although other displays are possible. As shown in FIG. 3, sentiment display 303 displays a graph of positive and negative sentiment (i.e., "bullish" or "bearish" trends) for gold and oil for the past hour. In FIG. 3, positive sentiment is displayed as a number between zero and one, neutral sentiment is displayed as zero, and negative sentiment is displayed as a number between zero and negative one, although other systems may be used. As seen from the graph, gold has positive sentiment over the past hour, whereas oil has a negative sentiment over the past hour.

Additionally, selectable items beneath the graph may allow the user to select different time periods over which to track the sentiment, such as the past day, week, or month. In addition to the graph, sentiment display 303 may further display a numerical value summarizing the change in sentiment for the selected keyword, such as the "▲+0.15" shown for gold. Moreover, as shown in FIG. 3, sentiment display 303 may track the names of users or organizations which have increased or decreased sentiment for a keyword, and display these names along with corresponding changes to the sentiment. Additional selectable icons or objects may allow a user to add new keywords to view. In addition, the drop down in the image currently showing "my desk", allows the user to view different ranges of input for analysis, for example, to see the sentiment for each keyword based on input of each trader at a trading desk or more broadly at a trading institution as a whole.

A drop-down menu 304 for a selected keyword may be located in active call section 301, and may allow a user to manually adjust sentiment. For example, the user may be provided with controls to manually adjust the sentiment derived by the analysis engine for a keyword, to what the user feels is more accurate. For example, if the user feels that a particular conversation is more positive on gold than the sentiment determined automatically by the analysis engine, the user may adjust sentiment for gold to be even more positive. The drop-down menu 304 may also provide selectable icons or objects for the user to access detailed voice/audio transcriptions, so that the user can visually inspect contextual words near the keywords.

Figure 4:
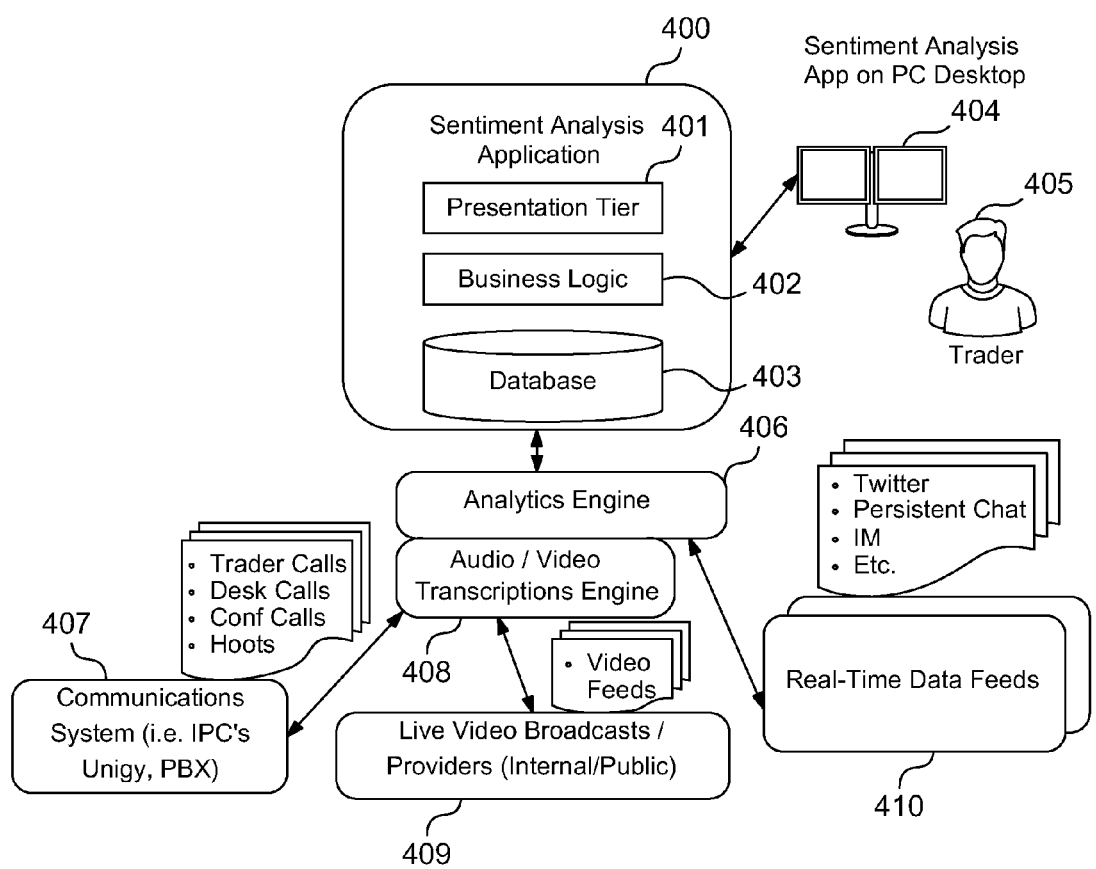
FIG. 4 is diagram for explaining sentiment analysis according to various example embodiments of the invention.

FIG. 4 is diagram for explaining sentiment analysis according to various example embodiments of the invention. In particular, FIG. 4 is a view for explaining how a sentiment analysis application 400 produces a sentiment analysis display from various data sources.

As shown in FIG. 4, sentiment analysis application 400 includes presentation tier 401, business logic 402, and database 403.

Presentation tier 401 generates a view such as that shown in FIG. 3 to enable easy digestion of sentiment of keywords from complex and varying data sets, such as calls, social networking feeds, and live video broadcasts, among others.

Business logic 402 (also referred to as business logic layer 402) associates sentiment data for one or more keywords from various sources, and provides real-time updates of information. The business logic connects the various systems involved, coordinates the necessary processing amongst the different systems, normalizes data so that can be stored in an intelligent fashion, stores data into the database 403, and retrieves data for the presentation tier 401. The business logic 402 is the control center of the entire system. Each input system such as communications system 407 or real-time data feeds 410, is registered in the business logic layer 402 with all necessary connection information so that the necessary data can be retrieved. Also, supporting systems, such as the analytics engine 406 and audio/video transcriptions engine 408, are registered in the business logic layer 402 so that the necessary functions supported in these systems can invoked as needed. With the connection in place the business logic 402 coordinates how the various systems work together to achieve the desired end result. Some data, such as a structured text based data from persistent chat, can processed directly as it is already in text form. Other data sources, such as communications data, is unstructured and in binary form so first needs to be sent to a transcription engine (e.g., audio/video transcriptions engine 408) for pre-processing so that it is in text-based structured form for processing.

Once all of the data is in text form and structured, the business logic 402 first needs to normalize the data so that there is a consistent structure that can be analyzed regardless of input type. To accomplish this there are different adapters per information source that are designed to take input data from a specific and unique source and output that data in a normalized fashion by mapping the data to a consistent data structure. The system is extensible and adapters can be added as needed depending on the given environment. With the data normalized and in text form, it is sent to the analytics engine 406 to determine the sentiment of keywords. The data is stored in the database 403 and sent to the analytics engine 406 where each field is examined against a list of keywords that exist in the database 403. The keywords are populated directly and indirectly by the end user as described earlier. If a keyword is found, the words surrounding the keyword (before and after) are analyzed for sentiment against a library of words and phrases that is specifically tailored for a given audience such as financial traders. The keywords identified, along with the determined sentiment, are then sent back to the business logic layer for storage in the database 403 alongside the original text or transcription of audio. All other necessary fields such as the source of the data and time it was created are stored into the database 403 as well. An abstraction layer can exist between the business logic 402 and database 403 to pool connections and allow for alternative relational databases to be used if needed. With the data now in a structured and normalized fashion in the database 403, SQL queries can be run to return data sets that are appropriate for the presentation tier 401 to display.

Database 403 aggregates derived sentiment data from various data sources, and correlates them by time (e.g., time the message/data is received). Database 403 may also store text transcriptions associated with audio and voice feeds. In that regard, storage of transcriptions or keywords may be discretionary to a user or administrator. Thus, for example, a user or administrator could choose to store or delete transcriptions after they are analyzed, or, if stored, the transcriptions could be deleted after a period of time defined by the user or administrator. In addition, privacy settings could be customized to restrict access to the transcripts to specific individuals.

Sentiment analysis application 400 can be executed on a computer (e.g., a PC desktop) as an executed sentiment analysis application 404 to provide a display of sentiment analysis to the user on a monitor or screen of a PC desktop, as shown in FIG. 3, or other devices such as a desk phone or turret. FIG. 3 is only an example, and other types of display are possible.

Trader 405 corresponds to a user who might use sentiment analysis application 404 to track sentiment regarding particular keywords. Naturally, non-trader users might also use the system.

Analytics engine 406 calculates sentiment for one or more keywords by looking for keywords in transcripts or other data feeds, and analyzing surrounding words to determine the keyword's use in context. Semantic analysis is then performed on the surrounding words in order to determine if the keywords are being used positively or negatively. Put another way, positive or negative words surrounding the keywords may give the keyword positive or negative sentiment values.

In the example shown in FIG. 4, analytics engine 406 receives transcriptions from audio/video transcriptions engine 408, and combines the text from the audio/video transcriptions with other real-time data feeds 410 for sentiment analysis. Audio/video transcriptions engine 408, in turn, may generate transcriptions from input calls from a communications system 407 or live video broadcasts/providers 409. With this, the audio of phone calls plus the audio portion of video calls and video broadcast are piped through the system where a real-time voice-to-text transcription occurs. Standard audio/video technologies such as the Real-Time Transport Protocol (RTP) and G.711 codec can be input into the transcription engine.

Communications system 407 includes, for example, trader calls, desk calls, conference calls, and "hoots", among others. Communications system 407 may also store a history of communication records regarding calls, such as the persons involved in the call and associations between one or more persons involved in the call and a particular asset, order, or institution. Associations between particular callers and other data may be managed by, for example, a separate customer relationship management (CRM) system, or an order relationship management (ORM) system (neither shown).

Audio/video transcriptions engine 408 generates text from input audio or video, such as communication system 407 and live video broadcasts/providers 409, to thereby provide a text record of the audio or video which can be analyzed for keywords and contextual data. The voice-to-text transcription system can also be trained for specific vocabulary and market segments.

Live video broadcasts/providers 409 include live video, which may include internal or public video feeds or other broadcast data. Live video or broadcasts may also include metadata which can also be analyzed by analysis engine 406.

Real-time data feeds 410 include Twitter™, persistent chat, instant messaging, and other social networking or multimedia data feeds.

As shown in FIG. 4, input data from communications system 407, live video broadcasts/providers 409 and real-time data feeds 410 are combined, transcribed (if necessary, e.g., for active audio or video communications), analyzed for sentiment, and aggregated to provide a display of sentiment about one or more keywords.

VI. Processes

Figure 5:
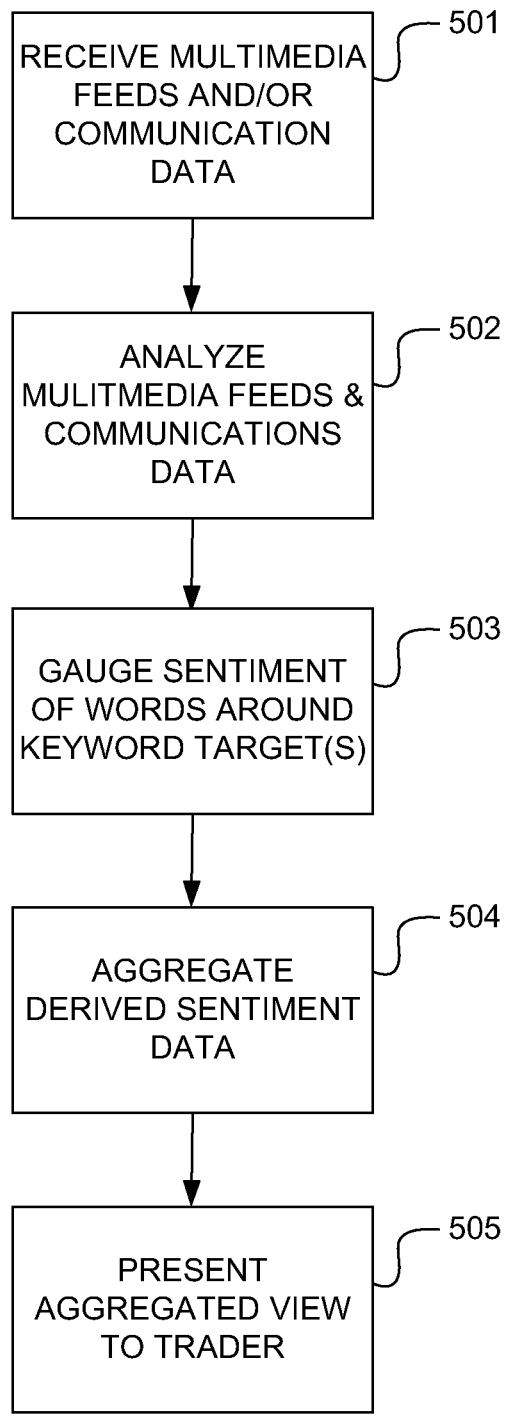
FIG. 5 is a flowchart diagram showing an exemplary procedure for sentiment analysis.

FIG. 5 is a flowchart depicting an exemplary process for sentiment analysis. In that regard, it should be understood that some steps in the process may be performed continuously, or only as needed, and therefore that the particular order and sequence of steps might change.

Briefly, in FIG. 5, data is received from multiple data sources. At least one of the data sources is an active audio or video communication. The received data is analyzed by extracting instances of a keyword from the received data and analyzing contextual data near the keyword. Sentiment about the extracted keyword is gauged based on the contextual data.

The derived sentiment data from the multiple data sources is aggregated, and an aggregated view of the derived sentiment data is presented.

In more detail, in step 501, multimedia feeds and/or communication data are received. For example, as discussed above, communication data might be transcribed from calls (from a person, desk of traders, floor of traders, "hoots", or conference calls), from a live video broadcast, or may be received from data feeds such as Twitter™, persistent chat and instant messaging (IM), among many others.

In step 502, the multimedia feeds and communication data are analyzed. In particular, instances of a keyword are extracted from the received data (via, for example, voice- or video-to-text transcription), along with contextual data near the keyword. Then, the contextual data near the keyword is analyzed to determine sentiment about the keyword. For example, surrounding words can be analyzed to determine the keyword's use in context, and whether the source has positive or negative feelings about the keyword.

In step 503, sentiment of the words around the keyword target is gauged, based on the analysis. For example, once it is determined whether the keyword is being used positively or negatively, a sentiment "score" for the keyword from that source can be calculated.

In step 504, the derived sentiment data from each of the various data sources is aggregated. In particular, sentiment data for a keyword (e.g., "oil") from various multiple sources such as calls, video broadcasts, and feeds can be aggregated to determine an overall sentiment for that keyword over all received communications.

In step 505, the aggregated view is presented to the trader (or other user) via, for example, a user interface such as that shown in FIG. 3. For example, the display may include the overall sentiment for the keyword, along with corresponding individual sentiment from each source for that keyword. Thus, the user is provided with a real-time/historic view of sentiment about, for example, various portfolio holdings throughout a financial institution or other group. In some examples, the aggregated view and derived sentiment data are shared among multiple users.

Figure 6:
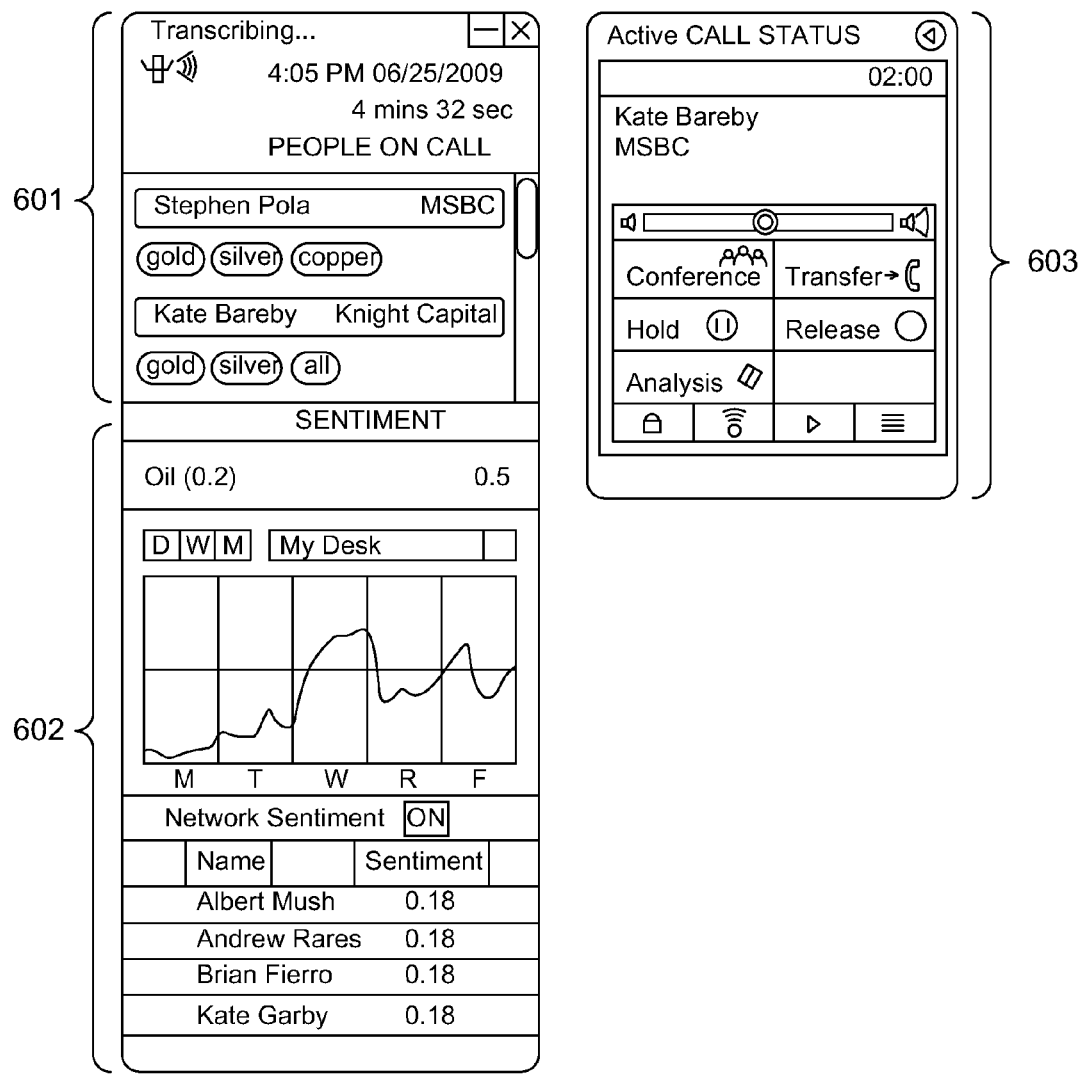
FIG. 6 is a representative view of another example user interface according to the invention.
Figure 7:
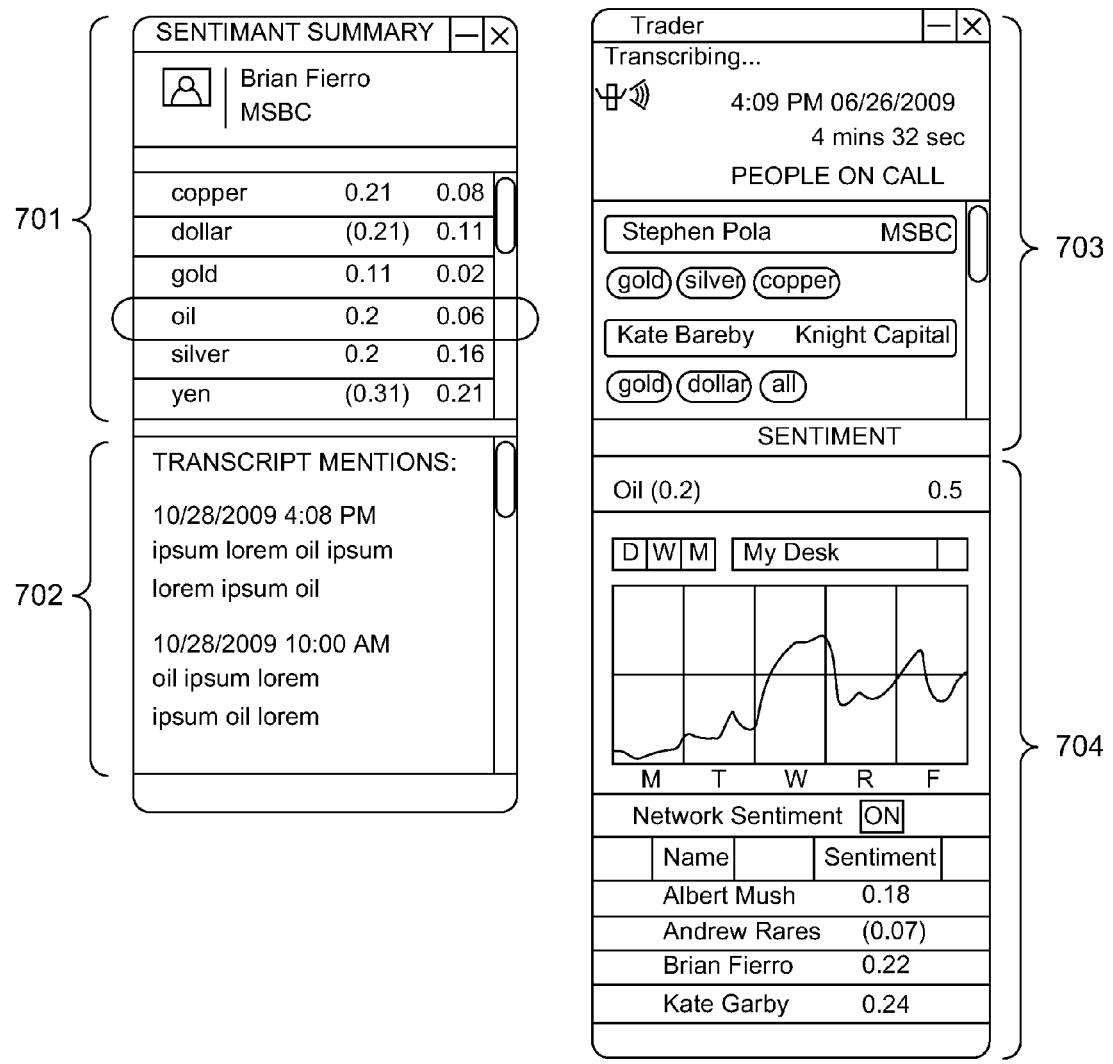
FIG. 7 is a representative view of still another example user interface according to the invention.

FIG. 6 and FIG. 7 depict additional examples of user interfaces according to example embodiments of the invention.

In particular, FIG. 6 depicts a view in which active calls are displayed along with keywords, but in which additional information and/or control icons or objects are displayed. For example, call analysis section 601 displays the time/date of the active call and its duration, as well as a status indicator indicating that the call is in the process of being transcribed. A user may select one of the extracted keywords to display additional sentiment information about the selected keyword in sentiment display 602.

Sentiment display 602 displays a graph of sentiments for oil from multiple sources, as well as the name of each individual source and its corresponding sentiment. Put another way, the user can see who has mentioned the keyword "oil", and what their sentiment for oil is. Additionally, an overall numerical value summarizing the change in sentiment for the selected keyword may also be displayed. The user may also be provided with a drop-down menu to switch to a trading desk or other application.

Thus, in the example of FIG. 6, the user can see that the sentiment for oil has generally been negative, but has recently been trading positively. The user can also see who has mentioned the keyword "oil", and what their sentiment for oil is.

Meanwhile, active call status 603 allows for selection of various options during the call, including volume, conferencing, transferring the call, and holding or releasing the call, as well as other telephone options such as speakerphone and the like. Active call status display 603 may also include an analysis icon which allows the user to toggle between analyzing and not analyzing an active call.

The user may also wish to gain additional information from a particular source, such as the source's sentiments towards other keywords. For example, in the example shown in FIG. 6, it appears that Brian Fierro has a positive sentiment towards oil. Thus, a trader might want to know what other keywords Brian Fierro has mentioned, as well as what Brian Fierro has said about those keywords.

Accordingly, in one example, a user could select Brian Fierro from the list of sources in FIG. 6, and further select a particular keyword from a list of keywords mentioned by Brian Fierro to research Brian's sentiment about that keyword and current sentiment trends for that keyword in general. The user may further request text transcribing what Brian Fierro has said about specific keywords.

For example, turning to FIG. 7, a user has selected Brian Fierro, and has then selected "oil" from a list of keywords. Upon request, or automatically, the user may then be provided with actual text transcript depicting Brian's use of the keyword "oil" in various contexts. Thus, a particular data source can be selected to display additional sentiment data associated with that data source, as well as transcripts of communications from the source.

In more detail, FIG. 7 depicts sentiment summary 701, transcript 702, call analysis 703, and sentiment analysis display 704. Sentiment summary 701 displays the identity of a selected person or group and an association thereof, along with a list of keywords mentioned by the person (here, Brian Fierro), and corresponding sentiment values and/or changes thereto. Transcript 702 may be displayed upon selection of a particular keyword, to show the actual text which the person said about the selected keyword. Thus, the text transcription of the telephone call is displayed along with the sentiment data and the contextual data. Call analysis 703 and sentiment analysis display 704 may be similar to those shown in FIG. 6, and therefore will not be described in detail again.

In additional example embodiments, alerts can be configured for notification of specific keyword sentiment thresholds. For example, an alert is issued when a sentiment threshold for the keyword is reached. In another example, automated alerts can be set to assist with specific trade strategy.

Thus, according to the above example embodiments, call/data analysis automatically spots keywords, and associates keyword data with accompanying sentiments. The sentiment analysis provides decision support based on captured sentiment across various and multiple sources. Accordingly, it is ordinarily possible to provide a transparent, communications centric approach to transcription and semantic analysis.

VII. Computer Readable Medium Implementation

The example embodiments described above such as, for example, the systems and procedures depicted in or discussed in connection with FIGS. 1 to 7, or any part or function thereof, may be implemented by using hardware, software or a combination of the two. The implementation may be in one or more computers or other processing systems. While manipulations performed by these example embodiments may have been referred to in terms commonly associated with mental operations performed by a human operator, no human operator is needed to perform any of the operations described herein. In other words, the operations may be completely implemented with machine operations. Useful machines for performing the operation of the example embodiments presented herein include general purpose digital computers or similar devices.

Portions of the example embodiments of the invention may be conveniently implemented by using a conventional general purpose computer, a specialized digital computer and/or a microprocessor programmed according to the teachings of the present disclosure, as is apparent to those skilled in the computer art. Appropriate software coding may readily be prepared by skilled programmers based on the teachings of the present disclosure.

Some embodiments may also be implemented by the preparation of application-specific integrated circuits, field programmable gate arrays, or by interconnecting an appropriate network of conventional component circuits.

Some embodiments include a computer program product. The computer program product may be a storage medium or media having instructions stored thereon or therein which can be used to control, or cause, a computer to perform any of the procedures of the example embodiments of the invention. The storage medium may include without limitation a floppy disk, a mini disk, an optical disc, a Blu-ray Disc, a DVD, a CD or CD-ROM, a micro-drive, a magneto-optical disk, a ROM, a RAM, an EPROM, an EEPROM, a DRAM, a VRAM, a flash memory, a flash card, a magnetic card, an optical card, nano-systems, a molecular memory integrated circuit, a RAID, remote data storage/archive/warehousing, and/or any other type of device suitable for storing instructions and/or data.

Stored on any one of the computer readable medium or media, some implementations include software for controlling both the hardware of the general and/or special computer or microprocessor, and for enabling the computer or microprocessor to interact with a human user or other mechanism utilizing the results of the example embodiments of the invention. Such software may include without limitation device drivers, operating systems, and user applications. Ultimately, such computer readable media further includes software for performing example aspects of the invention, as described above.

Included in the programming and/or software of the general and/or special purpose computer or microprocessor are software modules for implementing the procedures described above.

While various example embodiments of the invention have been described above, it should be understood that they have been presented by way of example, and not limitation. It is apparent to persons skilled in the relevant art(s) that various changes in form and detail can be made therein. Thus, the disclosure should not be limited by any of the above described example embodiments, but should be defined only in accordance with the following claims and their equivalents.

In addition, it should be understood that the figures are presented for example purposes only. The architecture of the example embodiments presented herein is sufficiently flexible and configurable, such that it may be utilized and navigated in ways other than that shown in the accompanying figures.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

The invention claimed is:

1. A method for analyzing received data, the method comprising:
using at least one processor to perform:
receiving data from multiple data sources, wherein at least one of the data sources is an active audio or video communication, the active audio or video communication being a live bi-directional communication between a plurality of devices;
analyzing the received data by extracting instances of a keyword from the received data and analyzing contextual data near the instances of the keyword;
deriving sentiment data about the keyword based on the contextual data;
aggregating the derived sentiment data from the multiple data sources; and
presenting an aggregated view of the derived sentiment data to a user, wherein the aggregated view includes an active call section corresponding to the live bi-directional active audio or video communication, the active call section including an icon corresponding to the keyword in a case that the keyword is mentioned by a party to the live communication other than the user, wherein, selecting the icon causes a control to be presented enabling adjustment of the party's sentiment towards the keyword and causes at least a portion of the contextual data to be presented, wherein an alert is issued when a sentiment threshold for the keyword is reached, and
wherein the active call section is configured to receive a command to perform at least one of:
toggling between analyzing and not analyzing the received data from the active audio or video communication; and
defining an additional keyword during the active audio or video communication.

2. The method according to claim 1, wherein at least another one of the data sources is an active audio or video broadcast, and wherein voice-to-text transcription is used to extract keywords and contextual data from the received data.

3. The method according to claim 2, wherein the voice-to-text transcription of the active audio or video broadcast is displayed along with the sentiment data.

4. The method according to claim 1, wherein the keyword and the contextual data are extracted from a live text-based communication.

5. The method according to claim 1, wherein positive and negative sentiment about the keyword are displayed as a graph of sentiment for the keyword.

6. The method according to claim 1, wherein a particular set of data sources can be selected to display sentiment data associated with those particular data sources.

7. The method according to claim 1, wherein one or more keywords are defined by the user, either directly or indirectly based on existing data sources in use by the user.

8. The method according to claim 1, wherein the aggregated view and the derived sentiment data are shared among multiple users.

9. A system for displaying a user interface, the system comprising at least one processor, wherein the processor is configured to:
receive data from multiple data sources, wherein at least one of the data sources is an active audio or video communication, the active audio or video communication being a live bi-directional communication between a plurality of devices;
analyze the received data by extracting instances of a keyword from the received data and analyzing contextual data near the instances of the keyword;

derive sentiment data about the keyword based on the contextual data;
aggregate the derived sentiment data from the multiple data sources; and
present an aggregated view of the derived sentiment data to a user, wherein the aggregated view includes an active call section corresponding to the live bi-directional active audio or video communication, the active call section including an icon corresponding to the keyword in a case that the keyword is mentioned by a party to the live communication other than the user, wherein, selecting the icon causes a control to be presented enabling adjustment of the party's sentiment toward the keyword and causes at least a portion of the contextual data to be presented, wherein an alert is issued when a sentiment threshold for the keyword is reached, and
wherein the active call section is configured to receive a command to perform at least one of:
toggling between analyzing and not analyzing the received data from the active audio or video communication; and
defining an additional keyword during the active audio or video communication.

10. The system according to claim 9, wherein at least another one of the data sources is an active audio or video broadcast, and wherein voice-to-text transcription is used to extract keywords and contextual data from the received data.

11. The system according to claim 10, wherein the voice-to-text transcription of the active audio or video broadcast is displayed along with the sentiment data.

12. The system according to claim 9, wherein the keyword and the contextual data are extracted from a live text-based communication.

13. The system according to claim 9, wherein positive and negative sentiment about the keyword are displayed as a graph of sentiment for the keyword.

14. The system according to claim 9, wherein a particular set of data sources can be selected to display sentiment data associated with those particular data sources.

15. The system according to claim 9, wherein one or more keywords are defined by the user, either directly or indirectly based on existing data sources in use by the user.

16. The system according to claim 9, wherein the aggregated view and the derived sentiment data are shared among multiple users.

17. A non-transitory computer-readable medium having stored thereon sequences of instructions, the sequences of instructions including instructions, which, when executed by a processor, cause the processor to perform:
receiving data from multiple data sources, wherein at least one of the data sources is an active audio or video communication, the active audio or video communication being a live bi-directional communication between a plurality of devices;
analyzing the received data by extracting instances of a keyword from the received data and analyzing contextual data near the instances of the keyword;
deriving sentiment data about the keyword based on the contextual data;
aggregating the derived sentiment data from the multiple data sources; and
presenting an aggregated view of the derived sentiment data to a user, wherein the aggregated view includes an active call section corresponding to the live bi-directional active audio or video communication, the active call section including an icon corresponding to the keyword in a case that the keyword is mentioned by a party to the live communication other than the user, wherein, selecting the icon causes a control to be presented enabling adjustment of the party's sentiment toward the keyword and causes at least a portion of the contextual data to be presented, wherein an alert is issued when a sentiment threshold for the keyword is reached, and
wherein the active call section is configured to receive a command to perform at least one of:
toggling between analyzing and not analyzing the received data from the active audio or video communication; and
defining an additional keyword during the active audio or video communication.

18. The method according to claim 1, wherein at least one of the active audio or video communication contains trader data.

19. The system according to claim 9, wherein at least one of the active audio or video communication contains trader data.

20. The non-transitory computer-readable medium according to claim 17, wherein at least one of the active audio or video communication contains trader data.

* * * * *